United States Patent
Huang et al.

(10) Patent No.: US 6,601,075 B1
(45) Date of Patent: Jul. 29, 2003

(54) SYSTEM AND METHOD OF RANKING AND RETRIEVING DOCUMENTS BASED ON AUTHORITY SCORES OF SCHEMAS AND DOCUMENTS

(75) Inventors: Anita Wai-Ling Huang, Oakland, CA (US); Neelakantan Sundaresan, San Jose, CA (US)

(73) Assignee: International Business Machines Corporation, Armonk, NY (US)

(*) Notice: Subject to any disclaimer, the term of this patent is extended or adjusted under 35 U.S.C. 154(b) by 315 days.

(21) Appl. No.: 09/626,613

(22) Filed: Jul. 27, 2000

(51) Int. Cl.[7] ............................................. G06F 17/30
(52) U.S. Cl. .................................................. 707/104.1
(58) Field of Search ........................ 707/2, 4, 10, 100; 709/226; 340/825.44

(56) References Cited

U.S. PATENT DOCUMENTS

| | | | | |
|---|---|---|---|---|
| 5,884,305 A | | 3/1999 | Kleinberg et al. ............. | 707/6 |
| 6,112,203 A | * | 8/2000 | Bharat et al. .................. | 707/5 |
| 6,138,113 A | * | 10/2000 | Dean et al. ..................... | 707/2 |
| 6,154,738 A | * | 11/2000 | Call .............................. | 707/4 |
| 6,336,112 B2 | * | 1/2002 | Chakrabarti et al. ........... | 707/5 |

OTHER PUBLICATIONS

Jon M. Kleinberg, "Authoritative Sources in a Hyperlinked Environment," preliminary versions of the paper appear in the Proceeding of the ACM–SIAM Symposium on Discrete Algorithms, 1998.

David Gibson, Jon Kleinberg, Prabhakar Raghavan, "Structural Analysis of the World Wide Web" printed from the following URL: http://www.w3.org/1998/11/05/WC–workshop/Papers/kleinber1.html on Jul. 23, 2000.

Qi Lu, Matthias Eichstaedt, Daniel Ford, "Efficient profile matching for large scale Webcasting," printed from the following URL: http://www7.scu.edu.au/programme/fullpapers/1923/com1923.htm on Jul. 23, 2000.

* cited by examiner

*Primary Examiner*—Safet Metjahic
*Assistant Examiner*—Sana Al-Hashemi
(74) *Attorney, Agent, or Firm*—Samuel A. Kassatly

(57) ABSTRACT

The ranking manager and associated method of the present invention rank the authority of XML documents and their corresponding schemas using an iterative process over a set of hyperlinked XML documents and their schemas. The ranking manager introduces the notion of authoritative schemas and document structure, and maintains an authority score for each document in the set, a hub score for each document in the set, and an authority score for each schema that is used by one or more documents in the set. The ranking manager initializes these scores according to predefined criteria, and then recomputes in successive iterations: (1) the authority scores for each schema based on the hub scores of the documents that use the schema and the authority scores of the documents that use the schema, (2) the authority scores for each document based on the authority score for the schema that it uses and the hub scores of the documents that point to it, and/or (3) the hub scores for each document in the set based on the authority score for the schema that it uses and the authority scores of the documents that it points to. The ranking manager performs these computations until convergence or a threshold value of difference is reached.

20 Claims, 4 Drawing Sheets

SYSTEM AND METHOD OF RANKING AND RETRIEVING DOCUMENTS BASED ON AUTHORITY SCORES OF SCHEMAS AND DOCUMENTS

FIELD OF THE INVENTION

The present invention relates to the field of data processing, and particularly to a software system and associated method adapted for use within a search engine system, to rank search results based on document quality. This invention pertains, in particular, to a computer software product and algorithm for retrieving and ranking XML documents and their associated document schemas based on the link relationships among them.

BACKGROUND OF THE INVENTION

The World Wide Web (WWW) is comprised of an expansive network of interconnected computers upon which businesses, governments, groups, and individuals throughout the world maintain inter-linked computer files known as web pages. Users navigate these pages by means of computer software programs commonly known as Internet browsers. Due to the vast number of WWW sites, many web pages have a redundancy of information or share a strong likeness in either function or title. The vastness of the WWW causes users to rely primarily on Internet search engines to retrieve information or to locate businesses. These search engines use various means to determine the relevance of a user-defined search to the information retrieved.

A typical search engine has an interface with a search window where the user enters an alphanumeric search expression or keywords. The search engine sifts through its index of web pages to locate the pages that match the user's search terms. The search engine then returns the search results in the form of HTML pages. Each set of search results includes a list of individual entries that have been identified by the search engine as satisfying the user's search expression. Each entry or "hit" includes a hyperlink that points to a Uniform Resource Locator (URL) location or web page.

A search of web pages using keywords, in most cases, returns an over-abundance of search-results. For example, a search for "Harvard" might result in an excessive number of web pages. Search engines face the challenge of ranking these results according to the most definitive pages for the search query. Text-based ranking alone will often miss some pages that are relevant to the search. Of the pages that contain "Harvard," for example, the web site www.harvard.edu may not be the one that uses the term "Harvard" most often, most prominently, or in any other way that would favor it under a purely text-based ranking function even when it is the most definitive result for a topic-based search query.

One approach to addressing this ranking problem is to exploit the information embedded in the hyperlink structure of WWW pages. Hyperlinks encode a considerable amount of human judgment used by various techniques to determine the authority or quality of a page in a specific context. Exemplary techniques that use algorithms to exploit the hyperlink structure within HTML pages for this purpose are the HITS and CLEVER methods. These algorithms have been implemented in search environments in order to determine the relevance of HTML pages to user-defined search criteria.

The HITS method introduces the notions of "authoritative" and "hub" resources. An authoritative resource (or authority page) is one that contains definitive information about a topic. In other words, in the context of search results, it is a high-quality page. A hub resource (or hub page) is one that contains a large number of hyperlinks that point to authoritative pages. The HITS algorithm is applied to a set of pages returned by a text-based search (a seed set). The goal is to determine the most authoritative pages and best hub pages in the set. To accomplish this goal, the HITS algorithm makes use of the structure of the in-links (the links into a web page) and the out-links (the links out of a web page) of each of the pages within the set. To begin, it counts the number of each page's out-links. In the first iteration, the initial 'hub' score of a page is the number of pages linking out of that page, and the initial 'authority' score of this page is the number of pages pointing to it. The 'hub' score for the next iteration is the sum of the 'authority' scores of the out-linked pages and the 'authority' score is the sum of the 'hub' scores of the in-linked pages. The iterations are continued until satisfactory convergence for the 'authority' and 'hub' scores is achieved. The pages with the highest 'hub' and 'authority' scores are identified as the results of the search.

HITS is the definitive algorithm used to find authoritative resources in a hyperlinked environment. The CLEVER method extends the HITS method by taking advantage of the text surrounding hyperlinks. It uses the annotations provided by this text to weight each link and further classify the search results.

A significant portion of the WWW documents today are authored in HTML, which is a mark-up language that describes how to display page information through a web-browser and to link documents up to each other. HTML is an instance of SGML (Standardized Markup Language) and is defined by a single document schema or Document Type Definition (DTD). The document schema puts forth a set of grammatical rules that define the allowed syntactical structure of an HTML document. The schema, or structure of HTML pages, is consistent from page to page. Both the HITS and CLEVER algorithms apply to HTML pages and do not necessarily address documents containing a number of different schemas.

Currently, however, Extensible Markup Language (XML) is gaining popularity. XML, which is a subset of SGML, provides a framework for WWW authors to define schemas for customized mark-up languages to suit their specific needs. For example, a shoe manufacturer might create a "shoe" schema to define an XML language to be used to describe shoes. The schema might define mark-up tags that include "color", "size", "price", "material", etc. Hence, XML documents written in this shoe language will embed semantic, as well as structural, information in the document. For example, a shoe XML document uses the mark-up tag "color" to indicate that the shoe is "blue".

One advantage of XML is that it allows the efficient interchange of data from one business to another (or within the business itself. A business may send XML data that conforms to a predefined schema to another business. If the second business is aware of the first business's schema, it may use a computer program to efficiently process the data. To enable this efficient data interchange and processing, XML requires that standard and high-quality schemas be developed and conformed to, by XML documents.

As noted, the XML framework allows for the definition of document schemas, which give the grammars of particular sets of XML documents (e.g. shoe schema for shoe-type XML documents, resume schema for resume-type XML documents, etc.). The XML framework also puts forth a set of structural rules that all XML documents must follow (e.g. open and close tags, etc.). Moreover, it is possible for an XML document to have no associated schema. If a document has an associated schema, the schema must be specified within the document itself or linked to by the document.

Information about the quality of an XML document may be inferred by its conformance with the rules put forth by this XML framework. An XML document is said to be "valid" if it has an associated schema and conforms to the rules of the schema. An XML document is said to be "well-formed" if it follows the general structural rules for all XML documents. Ultimately, a high quality document has a higher probability of being both "valid" and "well-formed" than a low-quality document.

In addition, like HTML documents, XML documents form a hyperlinked environment in which each XML document that has an associated schema provides a link to the schema (if the schema is not defined within the document itself. Moreover, each XML document, using various mark-up structures, such as XLink or XPointer, may link up to other XML structures and XML documents. Unlike the HTML environment, however, the schemas of each hyperlinked document may vary from document to document. A document that satisfies one particular schema can point to a document that satisfies a different schema. Further, two documents with different schemas can point to a document with a third schema. The quality of each schema may vary significantly.

To take full advantage of XML for efficient data interchange requires the use of standard, well-defined document schemas and XML documents that properly conform to them. The number of XML schemas and documents on the WWW today is rapidly increasing. The increasing diversity of document schemas adds a new dimension to the analysis of hyperlinked documents on the WWW.

The HITS and CLEVER algorithms make use of hyperlinked structures to rank documents that share the same schema. Exemplary documents with hyperlinked structures are HTML documents. XML has given rise to a new hyperlink environment that includes documents with different schemas. In this environment, it will become increasingly important to identify high-quality schemas and documents that correctly use them. Hence, this new environment presents several previously unaddressed issues: ranking documents based on the quality of their associated schema, determining the quality of the schemas themselves, and ranking documents based on their structural properties (e.g. validity, well-formedness, etc.). The WWW today calls for a system that finds and identifies authoritative XML-documents that take these factors into account. This need, which makes use of the new dimension added by XML, has heretofore remained unsatisfied.

SUMMARY OF THE INVENTION

The present system and method for identifying authoritative XML schemas and documents includes a ranking manager that satisfies this need. The present invention describes a retrieval system using a ranking manager and a method that extend the HITS algorithm by introducing the notions of document schemas and structural conformance to the algorithm. It rates the authority of XML documents and the authority of their associated document schemas based on an enhancement of the iterative algorithm originated by HITS.

Similar to the HITS and CLEVER algorithms, the present invention provides an algorithm which is applied to an initial set of documents. For example, a search for a topic (e.g. shoe) on the web might produce a large number of responses, or "hits", of XML documents. In one embodiment, the initial seed set includes these search results. In addition, the seed set includes all the XML documents linking into and out of these hits. In addition, the seed set also includes all schemas used by these XML documents in the expanded set. One goal of such an embodiment is to order these documents and their schemas by their authority (i.e., quality or reliability of search results) and hub scores.

As used herein, a document that is a good authority is a definitive representative of the search topic. A document that is a good hub links to a large number of documents that are good authorities. In general, good authorities are linked to from a large number of good hubs. Good authorities have a high authority score. Conversely, good hubs contain a large number of links to good authority documents. A good hub document has a high hub score. In addition, the present invention introduces the notion of an authoritative schema. A schema is said to be authoritative if it is used by a large number of authoritative pages and by a large number of good hub pages. An authoritative schema has a high authority score.

The ranking manager of the present invention uses a ranking software program, algorithm, or module, that is based on a base iterative algorithm, such as the HITS and/or CLEVER algorithms. The base algorithm maintains a hub score, $h(d)$, and an authority score, $a(d)$, for each document, d. It initializes these scores to some constant and recomputes them through a sequence of iterations. In a first step, the ranking algorithm recomputes the hub score, $h(d)$, of each document by replacing it with the sum of authority scores of the documents to which it points. Next, the ranking algorithm replaces the authority score, $a(d)$, of each document with the sum of the hub scores of the documents that point to it. In addition, the base algorithm, reiterates these steps until the difference among the hub scores, and/or the difference among the authority scores, in each iteration converge to a predetermined value such as 0.

The above described base algorithm has been used to find authoritative resources in hyperlinked environments, specifically HTML documents. XML introduces new dimensions to this analysis of authoritative resources. The present invention enhances the notation of authoritative resources based on the following observations. First, the quality of schemas provides a new source of information about the quality of the hyperlinked documents that use them. For example, the conformance of a document to a high-quality industry-standard schema confers on it a degree of authority. Second, the correctness of document structure provides information about its reliability. A hyperlinked document's structure, such as its validity and/or well-formedness adds weight to its authority. Third, the characteristics of a set of XML documents that share a common schema provide information about the quality of the shared schema. For example, if all documents that use a schema X are malformed and not valid, schema X will lose credibility as a good schema. Moreover, if only a handful of documents about shoes use schema X, while the rest of the documents about shoes use schema Y, it may be inferred that schema Y is a better schema than schema X. In this case, schema Y has more authority than schema X.

Hence, the iterative process of the present invention enhances the base algorithm to account for the attributes of document structure, which provide additional information about the document quality, and to account for the authority scores of the schemas that the documents use. To this end, the ranking manager adds weights to the hub and authority scores of each XML document based on document validity and well-formedness, and further introduces the notion of authoritative document schemas. Consequently, the ranking manager introduces a third step to the iterative process that computes and incorporates the authority score of these document schemas.

In order to implement this third step, the ranking manager, in addition to maintaining the hub and authority scores for each XML document, also maintains, for each schema, s, an authority score, a(s). The ranking manager begins by initializing the hub score, h(d), and authority score, a(d), of each XML document to a weighted value based on the document's validity and well-formedness. It initializes the authority score, a(s), of each schema, s, to 0 or some constant.

Each iteration includes the following three steps: (1) The ranking manager recomputes the authority score, a(s), of each schema used by the XML documents in the pool by adjusting it with a normalized sum of the hub scores of the documents that use the schema and the authority scores of the documents that use the schema; (2) it recomputes the hub score, h(d), for each XML document, d, in the pool by adjusting it with a normalized sum of the authority scores of the documents that it points to and the authority score of the schema that it uses; and (3) it recomputes the authority score, a(d), of each XML document in the pool by adjusting it with a normalized sum of the hub scores of the XML documents that point to it and the authority score of the schema that it uses. The ranking manager reiterates over these three steps until the difference between the scores computed from one iteration to the next reaches a predetermined threshold value or converge to 0.

Ultimately, the ranking manager ranks the documents and their schemas according to these computed values. Thus, the authoritative XML document and schema identifying system (or ranking manager) of the present invention provides several features and advantages, among which are the following:

The ability to identify documents with high authority and documents that are good hubs (and therefore of high quality in the search results) using the in-links and out-links of these documents, the structural attributes of these documents, and the authority of the schemas of these documents, The ability to identify schemas of high authority using the authority and hub scores of the XML documents that use them.

The incorporation of document validity and well-formedness into the ranking of documents.

The incorporation of schema quality into the ranking of documents.

The promotion of the use of highly rated standard schemas to write higher quality XML documents and promote schema standardization.

The promotion of the use of documents that use highly rated schema and discouragement of the use of documents with poorly written schema.

The promotion of the use of documents that are well structured and valid and discouragement of the use of documents that are poorly structured, invalid, or without a definite schema.

BRIEF DESCRIPTION OF THE DRAWINGS

The various features of the present invention and the manner of attaining them will be described in greater detail with reference to the following description, claims, and drawings, wherein reference numerals are reused, where appropriate, to indicate a correspondence between the referenced items, and wherein:

DETAILED DESCRIPTION OF THE INVENTION

Figure 1:
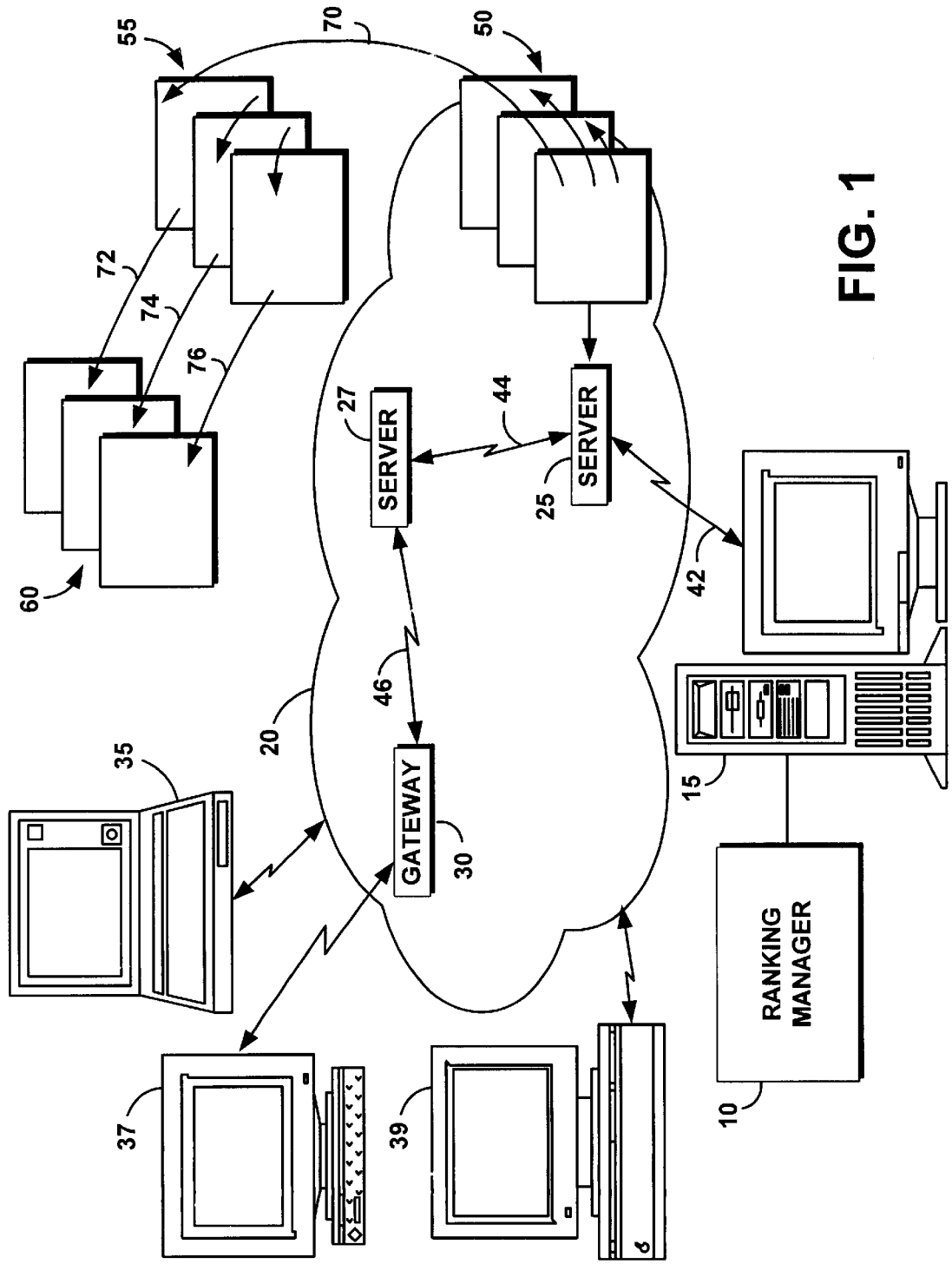
FIG. 1 is a schematic illustration of an exemplary operating environment in which a ranking manager of the present invention can be used.

The following definitions and explanations provide background information pertaining to the technical field of the present invention, and are intended to facilitate the understanding of the present invention without limiting its scope:

Crawler: A program that automatically explores the World Wide Web by retrieving a document and recursively retrieving some or all the documents that are linked to it.

DTD (Document Type Definition): A set of grammatical rules written in the syntax provided by the XML framework that describes the structure and syntax of an XML document type (or XML language). The DTD definitions for a document may be imbedded in the document or be in a separate file, linked to by the XML document. A DTD is an example of an XML document schema.

Hit: A response to a search query on the WWW. The response is a document found by the search engine that contains key words or other attributes relevant to the search query.

HTML (HyperText Markup Language): A standard language for attaching presentation and linking attributes to informational content within documents. During a document authoring stage, HTML "tags" are embedded within the informational content of the document. When the web document (or "HTML document") is subsequently transmitted by a web server to a web browser, the tags are interpreted by the browser and used to parse and display the document. In addition to specifying how the web browser is to display the document, HTML tags can be used to create hyperlinks to other web documents.

Internet: A collection of interconnected public and private computer networks that are linked together with routers by a set of standards protocols to form a global, distributed network.

Schema: A set of grammatical rules that define the allowed structure and syntax of a document. DTD is a specific type of schema, which is used to define XML languages.

Search engine: A remotely accessible World Wide Web tool that allows users to conduct keyword searches for information on the Internet.

Seed Set: An initial set of documents found by a search.

Server: A software program or a computer that responds to requests from a web browser by returning ("serving") web documents.

URL (Uniform Resource Locator): A unique address that fully specifies the location of a content object on the Internet. The general format of a URL is protocol://server-address/path/filename.

Web browser: A software program that allows users to request and read hypertext documents. The browser gives some means of viewing the contents of web documents and of navigating from one document to another.

Web document or page: A collection of data available on the World Wide Web and identified by a URL. In the simplest, most common case, a web page is a file written in HTML and stored on a web server. It is possible for the server to generate pages dynamically in response to a request from the user. A web page can be in any format that the browser or a helper application can display. The format is transmitted as part of the headers of the response as a MIME type, e.g. "text/html", "image/gif". An HTML web page will typically refer to other web pages and Internet resources by including hypertext links.

Web Site: A database or other collection of inter-linked hypertext documents ("web documents" or "web pages") and associated data entities, which is accessible via a computer network, and which forms part of a larger, distributed informational system such as the WWW. In general, a web site corresponds to a particular Internet domain name, and includes the content of a particular organization. Other types of web sites may include, for example, a hypertext database of a corporate "intranet" (i.e., an internal network which uses standard Internet protocols), or a site of a hypertext system that uses document retrieval protocols other than those of the WWW.

World Wide Web (WWW): An Internet client—server hypertext distributed information retrieval system.

Xlink (XML Linking Language): An XML syntax that allows the specification of hyperlinks within XML documents. The Xlink framework makes it possible to target a specific section of a document and adds other options to make linking easier.

XML (EXtensible Markup Language): A framework that enables the creation of mark-up languages through the definition and use of mark-up tags in a structured document. XML is a subset of SGML and provides the syntax to define a set of allowed tags and allowed structure for a document type. In these sense, an XML-defined language, like Wireless Markup Language (WML) is an instance of XML just as HTML is an instance of SGML. XML also allows the creation of documents that contain tags that have no pre-defined in a schema.

Xpointer (XML Pointer Language): An XML syntax that allows the specification of hyperlinks within XML documents. Xpointer enables internal XML structures to be referenced rather than referencing the entire page. The syntax is appended to a URL from another page to point to an element inside an XML document.

FIG. 1 portrays the overall environment in which a ranking manager 10 according to the present invention may be used. The ranking manager 10 includes a software or computer program product that is typically embedded within, or installed on a host server 15. Alternatively, the ranking manager 10 can be saved on a suitable storage medium such as a diskette, a CD, a hard drive, or like devices. While the ranking manager 10 will be described in connection with the WWW, the ranking manager 10 can be used with a stand-alone database of terms that may have been derived from the WWW and/or other sources.

The cloud-like communication network 20 is comprised of communication lines and switches connecting servers such as servers 25, 27, to gateways such as gateway 30. The servers 25, 27 and the gateway 30 provide the communication access to the WWW Internet. Users, such as remote Internet users are represented by a variety of computers such as computers 35, 37, 39, and can query the host server 15 for the desired information.

The host server 15 is connected to the network 20 via a communications link 42 such as a telephone, cable, or satellite link. The servers 25, 27 can be connected via high speed Internet network lines 44, 46 to other computers and gateways. The servers 25, 27 provide access to stored information such as hypertext or web documents indicated generally at 50, 55, and 60. The hypertext documents 50, 55, 60 most likely include embedded hypertext link to other locally stored pages, and hypertext links 70, 72, 74, 76 to other webs sites or documents 55, 60 that are stored by various web servers such as the server 27.

Figure 2:
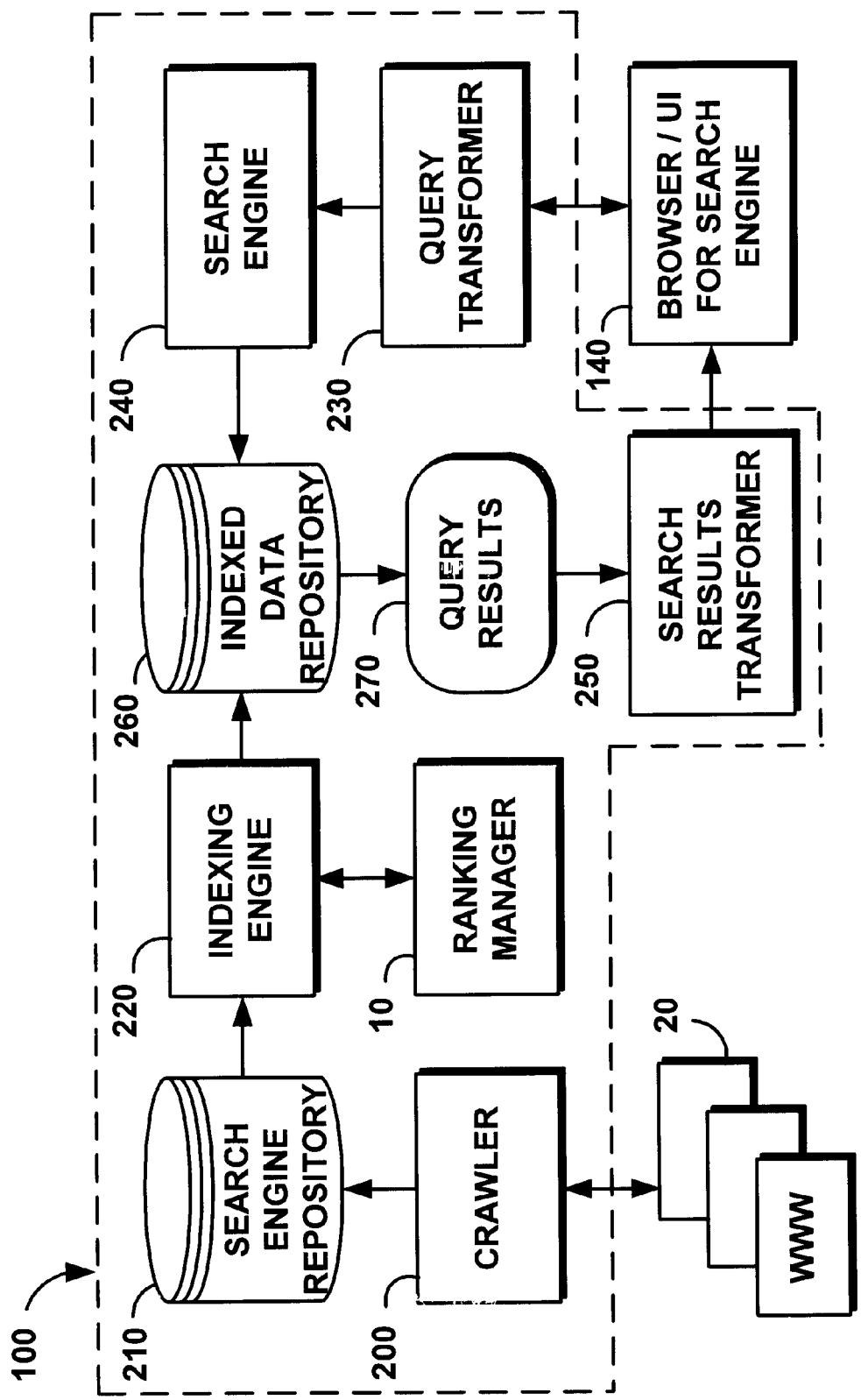
FIG. 2 is a block diagram that illustrates a high level architecture of the ranking manager of FIG. 1 shown used in the context of an Internet search.

The hypertext documents 50, 55, 60 can be represented as the WWW 20 in FIG. 2. Searches on the WWW are performed by the search service provider 100 that generally comprises a web crawler 200, a search engine repository 210, an indexing engine 220, a query transformer 230, a search engine 240, a search results transformer 250, and an indexed data repository 260.

In use, the crawler 150 crawls the WWW 20 and downloads web documents to the search engine repository 210 where they are stored and updated systematically. The indexing engine 220 indexes the XML web documents, their document data types (DTDs), and the linking relationships for all of the indexed documents. The indexed data is stored in the indexed data repository 260 for later use by the search engine 240, as appropriate.

The search engine repository 210 is a data store maintained by a web information gatherer such as the web crawler 200. The search engine repository 210 maintains information or metadata from previously encountered web pages. This metadata is used by the indexing engine 220 to prepare the index. Preferably, the search engine repository 210 is maintained centrally by the search service provider 100.

Alternatively, the search engine repository 210 may be located and maintained on an independently provided system to which the search service provider 100 has access. In addition, while the ranking manager 10 is described as including two repositories 210 and 260, it should be clear these two repositories 210 and 260 could be functionally combined in a single database. The indexing engine 220 generates a description for each web document from the metadata stored in the search engine repository 210.

The query transformer 230, prompted by the user browser 140, applies an internal query request to the indexed data stored in the indexed data repository 260, and generates a search result with matches (or query results) 270 that are specific to the user's query. The ranking manager 10 expands the initial query results, or seed set, to find all documents that link into and out of the query result set. The ranking manager 10 then applies a module that uses an algorithm for identifying authoritative XML schemas and documents on the expanded seed set and returns a sub-set of the expanded seed set that contain the documents with the highest authority scores, in the order of the documents' authority scores.

Once the ranking manager 10 retrieves the query results 270, the search service provider 100 transforms them into viewable form (i.e., HTML) that can be browsed by means of the query transformer 230. The transformed query results are subsequently presented to the user at the user interface (UI) or browser 140.

Figure 3:
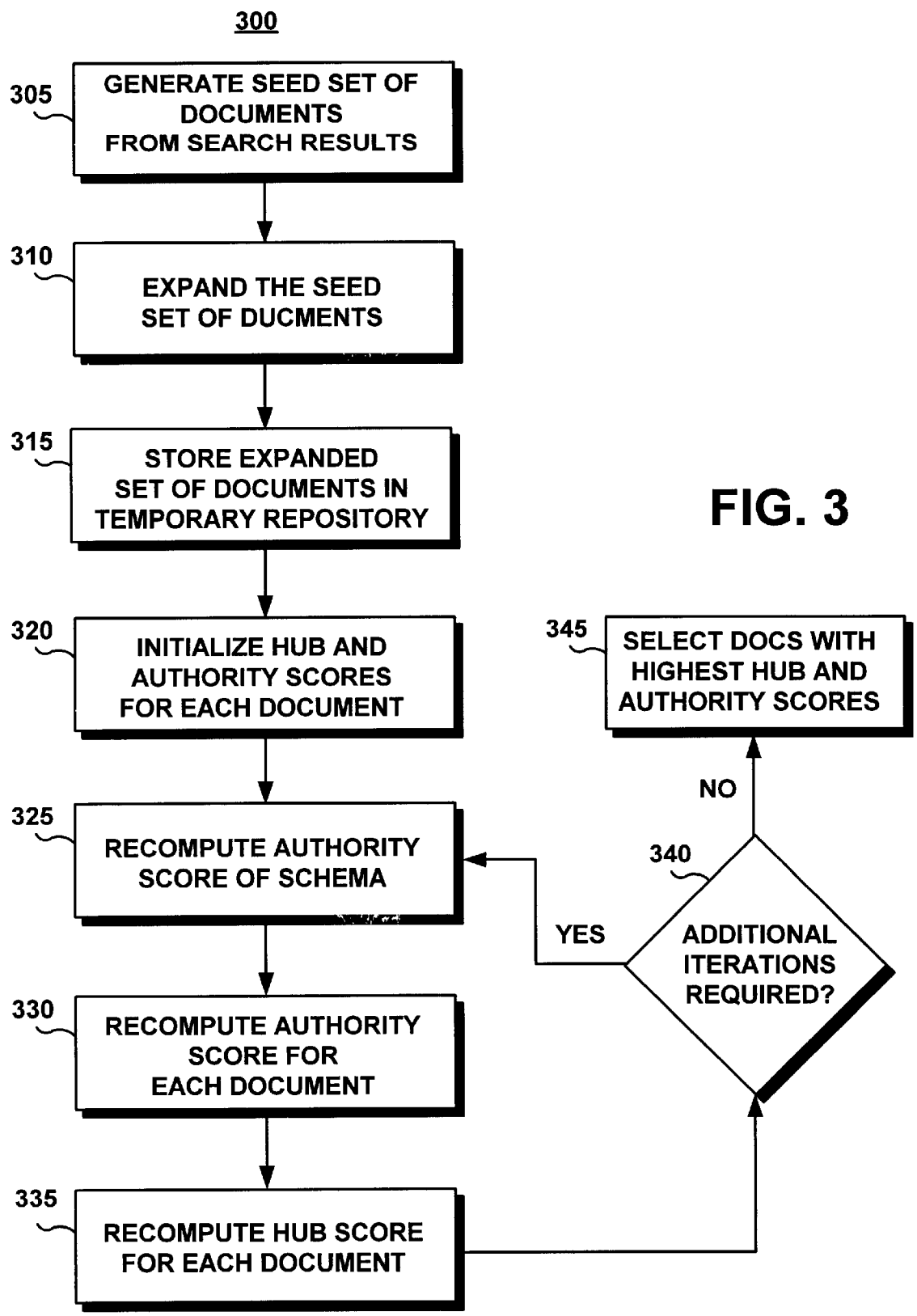
FIG. 3 is a flow chart that depicts tie operation of the ranking manager of FIGS. 1–2.

FIG. 3 shows a more detailed description of the method of operation of the ranking manager 10 for identifying authoritative XML schemas and documents. Though the invention will be described herein in the context of XML documents, it should be clear that other structured languages can alternatively be used. The search engine 240 (FIG. 2) generates a seed set of documents from the search results at step 305. Each document of the seed set has a document schema. In one embodiment, the schema may be a DTD. The ranking manager 10 expands the seed set of documents into an expanded set of documents at step 310, by crawling the document's links and including all the documents that point to the seed set of documents found at step 305. Step 310 is optional as the ranking manager 10 may alternatively use a look-up table in the search engine repository 210 that stores the links to the seed set of documents.

The expanded set of documents is stored in a temporary repository at step 315. For the initial pass at step 320, the ranking manager 10 initializes all the hub and authority scores, h(d) and aid), of all the XML documents, D={d0, d1, . . . }, in the set of expanded documents to values based on validity and well-formedness. It initializes the authority score, a(s), of all the schemas, S={s0, s1 . . . }, used by the set of documents in the expanded set to a predetermined value, such as 0.

At step 320, the ranking manager 10, uses the following three factors to initialize the hub and authority scores of the XML documents: valid, well formed, and other. The document is said to be valid if it follows the schema of the document. The document is said to be well-formed if it follows a good document structure; for example, all elements contains open and close tags. The document obtains a score "other" based on its text-match with the terms in the search query. Alternative embodiments may use different criteria to determine the score "other."

At step 325, the ranking manager 10 recomputes the authority score, a(s), for each schema, s, used by the XML documents in the expanded set, by adjusting it with the a normalized sum of the hub scores of the XML documents that use it and the sum of the authority scores of the XML documents that use it.

At step 330, the ranking manager 10 recomputes the authority score, a(d), of each XML document in the expanded set by adjusting it with a normalized sum of the hub scores of the XML documents that points to it and the authority score of the schema that it uses.

At step 335, the ranking manager 10 recomputes the hub score, h(d), for each XML document, d, in the set by adjusting it with a normalized sum of the authority scores of the documents that it points to and the authority score of the schema that it uses.

The ranking manager 10 inquires at step 340 if it should iterate again, based, for example, on whether or not the threshold for the difference in the hub scores h(d) and the threshold for the difference in the authority scores a(s) of successive iterations have not been reached. These thresholds would be considered reached if all the following conditions hold true:

1. the difference between the authority scores a(s) computed at the current step 325 and the authority scores a(s) computed at step 325 of the previous iteration (or computed at step 320 if the current step is the first iteration) is less than a predetermined threshold value, for example a constant C1,
2. the difference between the authority scores a(d) computed at the current step 330 and the authority scores a(d) computed at step 330 of the previous iteration (or computed at step 320 if the current step is the first iteration) is less than a predetermined threshold value, for example a constant C2, and
3. the difference between the hub scores h(d) computed at the current step 335 and the hub scores h(d) computed at step 335 of the previous iteration (or computed at step 320 if the current step is the first iteration) is less than a predetermined threshold value, for example a constant C3.

If the determination at decision step 340 is affirmative and at least one of the three thresholds has not been reached, the ranking manager 10 proceeds to step 325 and repeats steps 325, 330 and 335. Otherwise, if the determination at decision step 340 is negative and all the thresholds have been reached, the ranking manager 10 selects the orders the documents by the hub scores h(d) and authority scores a(d) and their schemas by authority scores a(s) at step 345.

Figure 4:
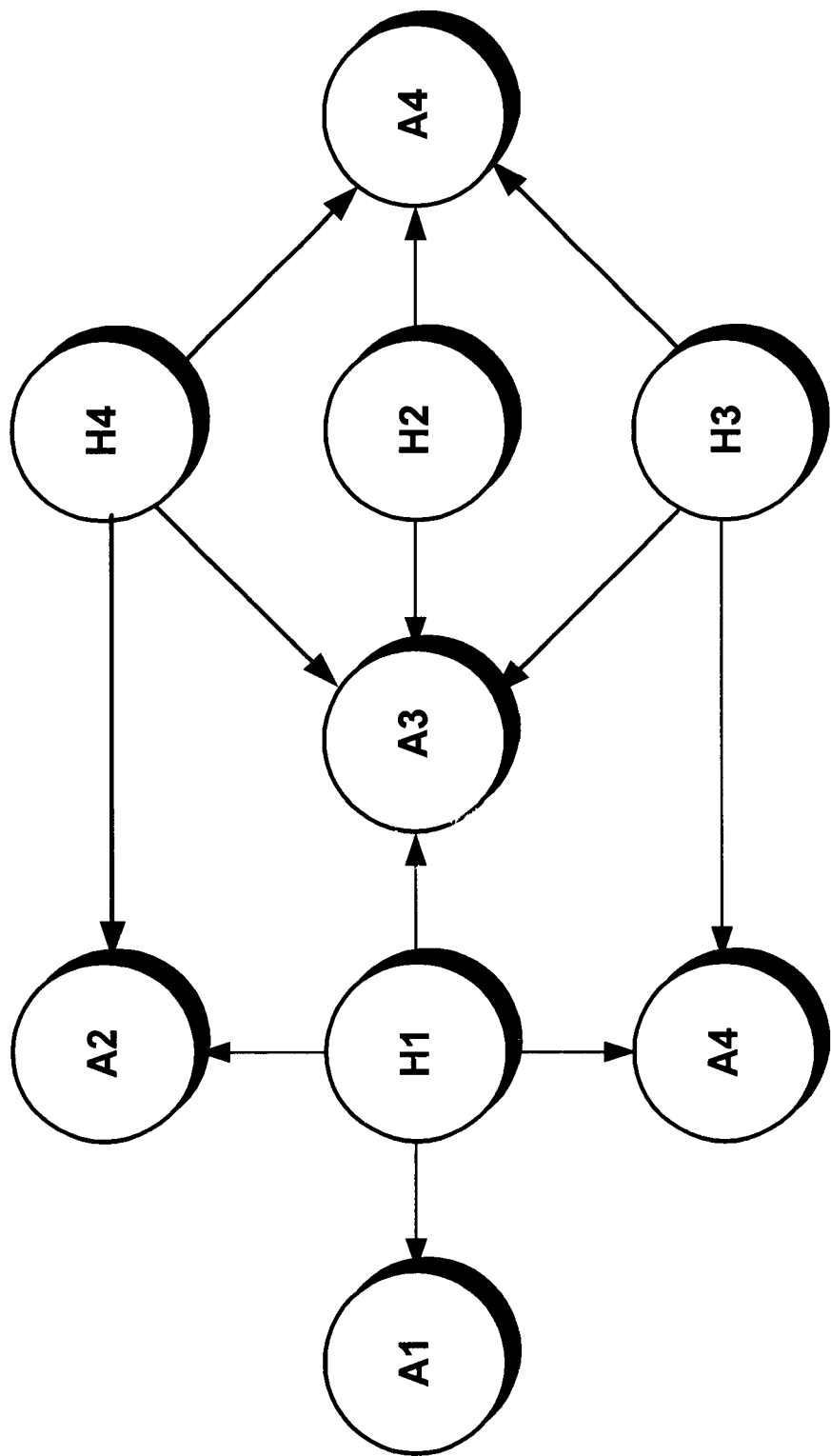
FIG. 4 is a diagram that illustrates exemplary links and relationships between hub documents and authority documents.

FIG. 4 shows a sample relationship, between hub documents and authority documents. Hub documents are designated as H1, H2, H3 and H4. Authority documents are designated as A1, A2, A3, and A4. The arrows between the documents represent links. A good hub document is a document that points to a document that is reliable and relevant, i.e., one that has high authority. A document with high authority is pointed to by good hubs or documents. A good hub document has a high hub score, and a good authority document has a high authority score.

The ranking manager 10 uses Xlinks and Xpointers for link identification among XML to documents. The Xlinks, or extended links, are semantic links that can be used to identify semantic relationships between documents. In another embodiment, the attributes of these links can be used to weight the authority and hub scores based upon the topic of interest. If the topic of interest is "play", links with "role", "act", or "stage" as attributes would have higher weights than those with unrelated attributes.

An exemplary process implemented by the iterative algorithm may be summarized as follows, with the understanding that this the notation used therein are included for the purpose of illustration and limitation:

"Let $D=\{d_0, d_1, d_2, \ldots, d_n\}$ be the set of XML documents.

Let $S=\{s_0, s_1, \ldots, s_m\}$ be the set of all schemas used by the document in D.

Note: m<n.

Let $h_k(d_i)$ be the hub score of $d_i$, $ak(d_i)$ be the authority score of $d_i$, and $ak(s_i)$ be the authority score of $s_i$ on iteration k.

Also, let t be the threshold of difference value.

Initialize for k=0:

For each $d_i$, $h_0 = a_0 = f(v_i) + f(w_i) + f(b_i)$, where $v_i$ is score for validity, $w_i$ is score for well-formedness, and $b_i$ it score for other, and f is some normalizing factor.

For each $s_i$, $a_0(s_i) = C$, where C is some constant.

While k=0 OR $(\text{sum}(0 \to n)(|h_k(d_i) - h_{k-1}(d_i)|) > t$

&& $\text{sum}(0 \to n)(|a_k(d_i) - a_{k-1}(d_i)|) > t$

&& $\text{sum}(0 \to m)(|a_k(s_i) - a_{k-1}(s_i)|) > t)$ do

For each $s_i$, $i = 0 \to m$, $$a_k(s_i) = f(\text{sum}(a_{k-1}(d_j))) + f(\text{sum}(h_{k-1}(d_j))),$$

where $d_j$ is in $D(s_i) = \{$all d that use schema $s_i\}$ and f is some normalizing function.

For each $d_i$, i=0→n, $$a_k(d_i)=f(a_{k-1}(d_i))+f(\text{sum}(h_{k-1}(d_j)))+f(a_k(s_j)),$$

where dj is in D(di)={fall d that point to di} and sj=schema used by di and f is some normalizing function.

For each $d_i$, i=0->n, $$h_k(d_i)=f(h_{k-1}(d_i))+f(\text{sum}(a_k(d_j)))+f(a_k(s_j)), \text{ where}$$

$d_j$ is in $D(d_i)$={all d that $d_i$ points to} and $s_j$=schema used by $d_i$ and f is some normalizing function."

The following example will help elucidate this process. Beginning with a set of 5 XML documents, each with a specified schema, the ranking manager 10 calls the set of documents D={$d_0, d_1, \ldots, d_4$} and the set of schemas S={$s_0, s_1$}. In this example, the documents $d_0$, $d_1$, and $d_2$ use schema $s_0$, and documents $d_3$ and $d_4$ use schema $s_1$. This example assumes that schemas $s_0$ and $s_1$ are two different DTDs, and that all documents $d_0$, $d_1$, $d_2$, and $d_3$ are well-formed, and that the two documents $d_0$ and $d_3$ are valid. This information and the link relationships are summarized in Table I below:

TABLE I

| DOCU- | POINTS TO | | | | | SCHEMA | | valid? | well-formed? |
|---|---|---|---|---|---|---|---|---|---|
| MENT | $d_0$ | $d_1$ | $d_2$ | $d_3$ | $d_4$ | $s_0$ | $s_1$ | | |
| $d_0$ | | | X | | | X | | yes | Yes |
| $d_1$ | X | | X | | | X | | no | Yes |
| $d_2$ | X | | | | | X | | no | Yes |
| $d_3$ | X | X | | | X | | X | yes | Yes |
| $d_4$ | X | X | | X | | | X | no | Yes |

The initial hub and authority scores, h(d) and a(d), respectively, for each document may be determined based on the following scores:

(1) the document validity (v),
(2) the document well-formedness (w), and
(3) other (b).

The normalizing and initializing factors used in the example are arbitrary and have been chosen for the purpose of illustration and not limitation.

Referring to step 320 of the process 300 (FIG. 3), assume for simplicity purpose that the initial hub and authority scores h(d) and a(d), respectively, are equal to v+w+b. If the document is valid, then its validity score equals 1 (v=1). If the document is well formed, its well-formedness score equals 1 (w=1), and the "other" score equals 1 (b=1) for all other documents.

Considering the 5 documents $d_0$–$d_4$, the ranking manager 10 generates the scores illustrated by the following Table II:

TABLE II

| SCHEMA | a(s) | DOCUMENT | a(d) | h(d) |
|---|---|---|---|---|
| $s_0$ | 0 | $d_0$ | 3 | 3 |
| $s_1$ | 0 | $d_1$ | 2 | 2 |
| | | $d_2$ | 2 | 2 |
| | | $d_3$ | 3 | 3 |
| | | $d_4$ | 2 | 2 |

Referring to step 325 of the process 300, for the first iteration, the ranking manager 10 recomputes the authority scores a(s) for each schema $s_i$, based on the normalized sums of hub scores h(d) and authority scores a(d) of each document that uses it (step 320). For this example, the ranking manager 10 adds all of the hub and authority scores of the documents that point to the schema $s_i$, divides it by the twice the number of these documents (to normalize the result) and replaces the authority score with the resulting value a(s), as illustrated by the following Table III:

TABLE III

| SCHEMA | sum (a(d)) | sum(h(d)) | num (d) | a(s) |
|---|---|---|---|---|
| $s_0$ | 3 + 2 + 2 | 3 + 2 + 2 | 2*3 | 2.3 |
| $s_1$ | 3 + 2 | 3 + 2 | 2*2 | 2.5 |

At step 330 of the process 300, the ranking manager 10 calculates the authority scores a(d) for each document d by adding to the last authority score, a(d), the sum of the hub scores h(d) of each document that points to the current document (from step 320), and the authority score a(s) for the schema (step 325) that the current document uses. In this example, the ranking manager 10 divides this sum by the number of documents that point to the current document plus 1 for the schema and 1 for the document itself, as illustrated by the following Table IV:

TABLE IV

| DOCUMENT | sum (h(d)) | a(s) | a(d) |
|---|---|---|---|
| d0 | 2 + 2 + 3 + 2 | 2.3 | 2.4 |
| d1 | 3 + 2 | 2.3 | 2.3 |
| d2 | 3 + 2 | 2.3 | 2.3 |
| d3 | 2 | 2.5 | 2.5 |
| d4 | 3 | 2.5 | 2.5 |

At step 335 of the process 300, the ranking manager 10 calculates the hub scores h(d) for each document by adding to its hub score h(d) (step 320) to the sum of the authority scores a(d) (step 330) of each document that it points to and the authority score a(s) for the schema (step 325) that the document uses, divided by the number of documents it points to plus 1 for the schema and 1 for itself, as illustrated by the following Table V:

TABLE V

| DOCUMENT | sum (a(d)) | a(s) | h(d) |
|---|---|---|---|
| d0 | 2.3 | 2.3 | 2.5 |
| d1 | 2.4 + 2.3 | 2.3 | 2.2 |
| d2 | 2.3 | 2.3 | 2.2 |
| d3 | 2.4 + 2.3 + 2.5 | 2.5 | 2.5 |
| d4 | 2.4 + 2.3 + 2.5 | 2.5 | 2.3 |

In the next iteration, the ranking manager 10 repeats steps 325 through 335 of the first iteration and adjusts each of the scores as described above. Steps 325 through 340 for the second and subsequent iterations are similar to those of the first iteration. The ranking manager 10 continues to adjust the scores by iterating steps 325 through 340 until no changes occur in the scores, or until the predetermined difference thresholds are reached.

It is to be understood that the specific embodiments of the invention that have been described are merely illustrative of certain application of the principle of the present invention. Numerous modifications may be made to ranking manager 10 described herein without departing from the spirit and scope of the present invention. For example, the normalization, initialization, and summation factors may be adjusted for optimal results. Moreover, while the present invention is described for illustration purpose only in relation to the WWW, it should be clear that the invention is applicable as well to databases and other tables with indexed entries.

What is claimed is:

1. A method for retrieving documents and associated schemas, comprising:

retrieving a seed set of documents with a hyperlinked structure, and associated schemas;

maintaining a hub score, h(d), and an authority score, a(d), for each document of the seed set, and an authority score a(s) for each schema used by one or more documents in the set;

initializing the hub score, h(d), the authority score, a(d), and the authority score a(s) to respective predefined criteria; and iteratively recomputing any one or more of:
the authority score a(s) for each schema based on the hub scores h(d) of the documents that use the schema and the authority scores a(d) of the documents that use the schema;
the authority scores a(d) for said each document in the set based on the authority score a(s) for the schema used by said each document and the hub scores (d) of the documents that point to said each document; or
the hub scores h(d) for said each document in the set based on the authority score a(s) for the schema used by said each document and the authority scores a(d) of the documents that said each document points to;

ordering the documents according to any one or more of the authority score a(d) or the hub score h(d) of the documents, ordering the schemas according to the authority score a(s) of the schemas, returning an ordered set of documents from the seed set of documents.

2. The method of claim 1, further including computing corresponding weights to the hub score, h(d), and the authority score, a(d), of said document based on a structure of said each document.

3. The method of claim 2, wherein computing corresponding weights includes computing weights to the hub score, h(d), and the authority score, a(d), of said document based on document validity, and well-formedness.

4. The method of claim 1, wherein iteratively recomputing including recomputing the authority score a(s), the authority scores a(d), and the hub scores h(d) until convergence is reached.

5. The method of claim 1, wherein iteratively recomputing including recomputing the authority score a(s), the authority scores a(d), and the hub scores h(d) until a threshold value of difference is reached.

6. The method of claim 4, further including ranking the documents in the set and the associated schemas according to the recomputed authority score a(s), the authority scores a(d), and the hub scores h(d).

7. The method of claim 5, further including ranking the documents in the set and the associated schemas according to the recomputed authority score a(s), the authority scores a(d), and the hub scores h(d).

8. A method for ranking a set of documents, d, with a hyperlinked structure, and associated schemas, comprising:

maintaining a hub score, h(d), and an authority score, a(d), for each document, d, and an authority score a(s) for each schema used by one or more documents in the set;

initializing the hub score, h(d), the authority score, a(d), and the authority score a(s) to respective predefined criteria; and iteratively recomputing any one or more of:
the authority score a(s) for each schema based on the hub scores h(d) of the documents that use the schema and the authority scores a(d) of the documents that use the schema;
the authority scores a(d) for said each document in the set based on the authority score a(s) for the schema used by said each document and the hub scores (d) of the documents that point to said each document;
the hub scores h(d) for said each document in the set based on the authority score a(s) for the schema used by said each document and the authority scores a(d) of the documents that said each document points to.

9. The method of claim 8, further including computing corresponding weights to the hub score, h(d), and the authority score, a(d), of said document based on a structure of said each document.

10. The method of claim 9, wherein computing corresponding weights includes computing weights to the hub score, h(d), and the authority score, a(d), of said document based on document validity, and well-formedness.

11. The method of claim 9, wherein iteratively recomputing including recomputing the authority score a(s), the authority scores a(d), and the hub scores h(d) until convergence is reached; and ranking the documents in the set and the associated schemas according to the recomputed authority score a(s), the authority scores a(d), and the hub scores h(d).

12. The method of claim 9, wherein iteratively recomputing including recomputing the authority score a(s), the authority scores a(d), and the hub scores h(d) until a threshold value of difference is reached; and ranking the documents in the set and the associated schemas according to the recomputed authority score a(s), the authority scores a(d), and the hub scores h(d).

13. A system for retrieving a set of documents, d, with a hyperlinked structure, and associated schemas, comprising:

a ranking module for maintaining a hub score, h(d), and an authority score, a(d), for each document, d, and an authority score a(s) for each schema used by one or more documents in the set;

the ranking manager initializing the hub score, h(d), the authority score, a(d), and the authority score a(s) to respective predefined criteria; and the ranking module iteratively recomputing any one or more of:
the authority score a(s) for each schema based on the hub scores h(d) of the documents that use the schema and the authority scores a(d) of the documents that use the schema;
the authority scores a(d) for said each document in the set based on the authority score a(s) for the schema used by said each document and the hub scores (d) of the documents that point to said each document;
the hub scores h(d) for said each document in the set based on the authority score a(s) for the schema used by said each document and the authority scores a(d) of the documents that said each document points to.

14. The system of claim 13, wherein the ranking manager further computes corresponding weights to the hub score, h(d), and the authority score, a(d), of said document based on a structure of said each document.

15. The method of claim 14, wherein the set of documents include XML documents.

16. The method of claim 14, wherein the ranking manager iteratively recomputes the authority score a(s), the authority scores a(d), and the hub scores h(d) until convergence is reached; and the ranking manager ranks the documents in the set and the associated schemas according to the recomputed authority score a(s), the authority scores a(d), and the hub scores h(d).

17. The method of claim 14, wherein the ranking manager iteratively recomputes the authority score a(s), the authority scores a(d), and the hub scores h(d) until a threshold value of difference is reached; and the ranking manager ranks the documents in the set and the associated schemas according to the recomputed authority score a(s), the authority scores a(d), and the hub scores h(d).

18. A computer software product for ranking a set of documents, d, with a hyperlinked structure, and associated schemas, comprising:

a ranking module for maintaining a hub score, h(d), and an authority score, a(d), for each document, d, and an authority score a(s) for each schema used by one or more documents in the set;

the ranking manager initializing the hub score, h(d), the authority score, a(d), and the authority score a(s) to respective predefined criteria; and the ranking module iteratively recomputing any one or more of:

the authority score a(s) for each schema based on the hub scores h(d) of the documents that use the schema and the authority scores a(d) of the documents that use the schema;

the authority scores a(d) for said each document in the set based on the authority score a(s) for the schema used by said each document and the hub scores (d) of the documents that point to said each document;

the hub scores h(d) for said each document in the set based on the authority score a(s) for the schema used by said each document and the authority scores a(d) of the documents that said each document points to.

19. The computer software product of claim 18, wherein the ranking manager further computes corresponding weights to the hub score, h(d), and the authority score, a(d), of said document based on a structure of said each document.

20. The computer software product of claim 19, wherein the set of documents include XML documents;

wherein the ranking manager iteratively recomputes the authority score a(s), the authority scores a(d), and the hub scores h(d) any one or more conditions is satisfied: convergence is reached or threshold value of difference is reached; and the ranking manager ranks the documents in the set and the associated schemas according to the recomputed authority score a(s), the authority scores a(d), and the hub scores h(d).

* * * * *